UNITED STATES PATENT OFFICE.

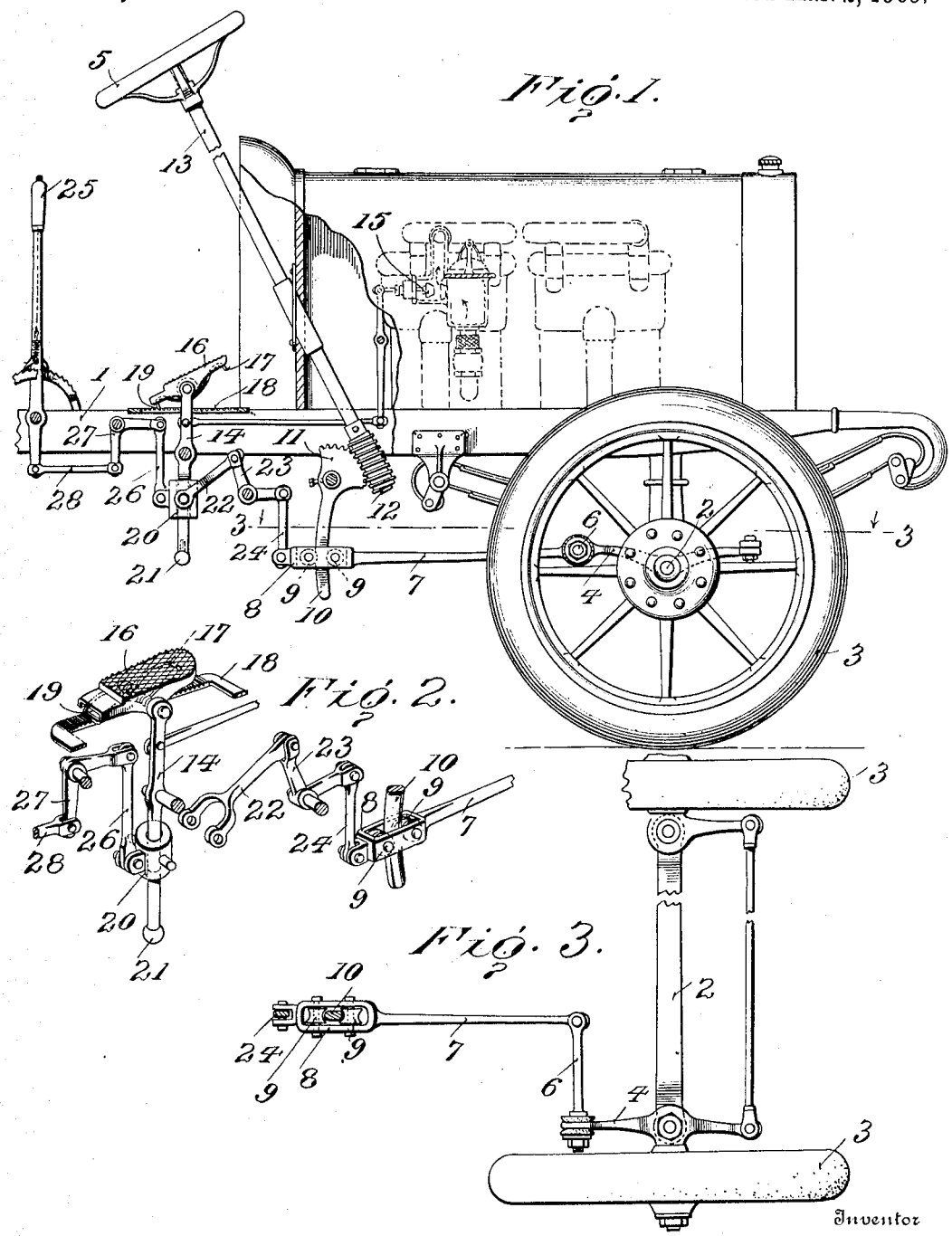

DAVID H. COLES, OF BROOKLYN, NEW YORK.

STEERING AND GOVERNING MECHANISM FOR MOTOR-CARS.

No. 914,020.   Specification of Letters Patent.   Patented March 2, 1909.

Application filed July 31, 1908. Serial No. 446,317.

*To all whom it may concern:*

Be it known that I, DAVID H. COLES, of Brooklyn, New York, have invented a new and useful Improvement in Steering and Governing Mechanism for Motor-Cars, which improvement is fully set forth in the following specification.

My invention relates to steering mechanism for power-propelled vehicles, such as automobiles, and has for its object to provide means whereby a given movement of the steering wheel or other steering device will in a given unit of time produce approximately the same deviation from a straight line at various speeds.

In my prior applications for steering mechanisms for self-propelled vehicles, Serial Number 411,996, filed January 21st, 1908, and Serial Number 431,845, filed May 9th, 1908, I have described and claimed devices of the above character in which a lever is interposed between the steering wheel or other means for controlling the steering mechanism and the steering front wheels of automobiles, and is so arranged that the relative lengths of the two arms of the lever may be changed or varied with the increase or decrease in the speed of the vehicle, to the end that said lever shall operate to turn the wheels at a less angle when the machine is moving at a high rate of speed than when it is moving at a low rate of speed, even though the steering wheel or other corresponding control device is shifted to substantially the same extent in both cases.

In accordance with my present invention, I regulate the action of the steering device by action of the change speed mechanism in combination with a throttle and spark controlling means, commonly denoted as the accelerator, whereby any change of speed, due, for example, to the change of low to high speed gear or due to movement of the accelerating device while the engine is on high or low speed gear, will act on the steering device to properly regulate its action to cause a given movement of the steering wheel or other steering device in a given unit of time to produce approximately the same deviation from a straight line at various speeds.

While the change speed mechanism coöperates with the accelerating device to effect the results above stated, either device is capable of independent operation or may be used in combination, in accordance with my invention.

With my present movement applied to a motor car, every movement of the change speed device or of the accelerating device will affect the steering lever mechanism which controls the front steering wheels, thereby avoiding excessive deviations from the line of travel when the machine is moving at high rates of speed.

The inventive idea involved is capable of expression in a variety of mechanical structures, one of which, for the purpose of illustrating the invention, will be hereinafter specifically described and then pointed out in the claims, but it is to be understood that such drawings are for the purpose of illustration only, and are not designed to define or limit the scope of the invention, reference being had to the claims for that purpose.

In said drawings—Figure 1 is a broken elevational view, partly in section, showing the forward part of the frame and steering mechanism of an automobile to which my improvement is applied; Fig. 2 is an enlarged detail showing parts of the device in perspective; and Fig. 3 is a plan view taken on the line 3—3 of Fig. 1.

Referring to the drawings, 1 indicates the frame of an automobile, 2 the front axle thereof, and 3 the front wheels, which as usual, are connected to the axle so as to have angular adjustment with relation thereto for the purpose of steering the vehicle, said angular adjustment being secured through a lever 4 rigid with the spindle upon which the wheels turn, and which is connected by suitable means to the steering wheel 5. In the present instance this means consists of a link 6 turning in the end of lever 4 and the steering rod 7 pivotally connected to link 6 and having at its opposite extremity an enlarged eye member 8 provided with anti-friction rollers 9, between which is received a steering lever 10 forming a part of or integral with a geared segment 11 pivotally mounted on a part of the frame and engaging a worm gear 12 on the end of the spindle 13 carrying the steering wheel 5.

Mounted on the frame 1 in proximity to the operator is a throttle-operating lever 14 having suitable connection with a throttle valve 15 controlling the passage between the carbureter and the engine cylinder. Mounted on the top of this lever is a pedal 16 normally depressed in the direction of its lower end, by means of a spring 17, and provided with means for locking it at any desired position, such as by means of a plate 18 having perforations for receiving a pin or projecting member 19 on the pedal 16. One arm of the throttle lever 14 is lengthened to receive a sleeve 20 which is prevented from slipping off the lever arm by means of a head 21 screwed on the end of the lever arm. Pivotally connected to this sleeve 20 is a link 22 which engages one arm of bell crank lever 23, the other arm of the bell crank having a link connection 24 with the end of steering rod 7, to which it is pivotally connected. The bell crank lever is preferably formed with an obtuse angle to better enable an extended movement of the link 24 in raising and lowering the end of the steering lever 7. Also connected with the sleeve 20 is the change gear lever 25 through a link 26 pivoted to one arm of a bell crank lever 27, the other arm of the bell crank being connected through a link 28 with the change gear lever 25.

The operation of the device as thus far described is as follows:—With the parts as shown in Fig. 1, the car is moving at a low speed, and the engine is working on the low speed gear. Assuming that it is desired to increase the speed of the car by means of the accelerator which operates the throttle valve, the forward end of the pedal 16 is depressed, thereby releasing the catch or locking pin 19 and the lever 14 is pressed forward, thereby opening the throttle valve through its connections therewith. This movement of the lever 14 throws its lower arm to the rear, thereby carrying with it sleeve 20, which, by reason of its link connection 26 with bell crank 27, which latter is locked by the change gear lever 25, is forced outward or downward on the lever arm 14, carrying with it link 22, and thereby tilting bell crank 23 to the left and raising the outer end of steering arm 7 to shift the latter on the lever arm 10, and decreasing the leverage of the steering device. By thus shortening the effective length of the lever arm 10, a given movement of the steering wheel 5 will in a given unit of time thus produce approximately the same deviation from a straight line as when the car was moving at its low speed. In like manner, control of the steering mechanism is secured when the speed of the car is varied by changing the speed gear, as for instance, when the engine is running on low gear and the throttle valve is part-way open, as shown in Fig. 1. The engine may be speeded higher by throwing the change gear lever 25 forward. In response to this change of gear, the leverage of the steering mechanism is diminished by the upward shifting of the end of the steering rod 7 on lever arm 10. This is effected by the downward movement of sleeve 20 caused by the tilting of bell crank lever 27 to the right by the forward thrust of change gear lever 25. Link 26 is thereby forced down or the arm of lever 14 to take a position thereon farther from the fulcrum of the lever. Through link 22, bell crank lever 23 and link 24, this movement lifts the end of steering rod 7 on the steering lever to thereby change the leverage of the steering mechanism to correspond to the increased speed of the vehicle.

When the engine is running on high gear and further change of speed is effected by opening the throttle by action of the accelerating device, it is desirable that proportionally greater changes in leverage of the steering lever 10 be made than when the accelerator is shifted on low gear to secure the desired angulation of the steering wheels. It will be apparent from what precedes that a given angular movement of the accelerating lever 14 will cause sleeve 20 to move through a longer arc the farther it is removed from the fulcrum support of the lever 14. A displacement of the pedal end of lever 14 one notch, for example, measured on plate 18 swings the lower arm of lever 14, and with it sleeve 20, through a shorter arc when in low speed gear position than when in high speed gear position. Bell crank lever 23 will be therefore tilted through a greater angle by this cause alone in the latter case than in the former, and hence the end of steering rod 7 will be shifted proportionally farther for accelerator changes in high speed than for like changes in low speed, as it is apparent it should be.

The control of the steering mechanism by my improvement is equally effective irrespective of whether the speed of the vehicle increases or decreases, and whether the change is effected through the action of the change speed gear or of the accelerator. While I have described the accelerator as comprising throttle-controlling means and spark-controlling means, my improvement is equally serviceable with either of these devices.

It will be apparent to those skilled in the art that various changes in proportions and relative arrangement of parts may be made without departing from the spirit of my invention, and all such changes are designed and intended to be included in my claims.

What I claim is:—

1. In steering mechanism for self-propelled vehicles having wheels which are turned to effect the steering thereof, the combination of steering mechanism to effect the steering movement, change gear operating means, engine controlling means, and means varying the action of said steering mechanism controlled by the movement of either of said change gear or engine controlling means.

2. In steering mechanism for self-propelled vehicles having wheels which are turned to effect the steering thereof, the combination with such wheels, of a manually operable power device, lever mechanism transmitting power from said device to said wheels to effect the steering movement, engine-controlling means, and means operated by said controlling means varying the leverage of said lever mechanism according to speed variations of the vehicle.

3. In steering mechanism for self-propelled vehicles having wheels which are turned to effect the steering thereof, the combination with such wheels, of a manually operable power device, lever mechanism transmitting power from said device to said wheels to effect the steering movement, engine controlling means, a slidable member having a connection to said lever mechanism and actuated by said engine controlling means to vary the leverage of said lever mechanism according to speed variations of the vehicle.

4. In steering mechanism for self-propelled vehicles having wheels which are turned to effect the steering thereof, the combination with such wheels, of a manually operable power device, lever mechanism transmitting power from said device to said wheels to effect the steering movement, change gear operating means, throttle-operating means, and means operated by said two last named means varying the leverage of said lever mechanism according to speed variations of the vehicle.

5. In steering mechanism for self-propelled vehicles having wheels which are turned to effect the steering thereof, the combination with such wheels, of a manually operable power device, lever mechanism transmitting power from said device so said wheels to effect the steering movement, a throttle controlling lever, a sleeve on one arm of said lever slidable on the same and responding to the movement of said lever, and means transmitting the movement of said sleeve to said lever mechanism to vary the leverage of the latter according to speed variations of the vehicle.

6. In steering mechanism for self-propelled vehicles having wheels which are turned to effect the steering thereof, the combination with such wheels, of a manually operable power device, lever mechanism transmitting power from said device to said wheels to effect the steering movement, a throttle controlling lever, a speed change gear lever, a sleeve on one arm of said controlling lever and slidable thereon by the operation of either of said last named levers, and means responding to the movement of said sleeve for varying the leverage of said mechanism according to speed variations of the vehicle.

7. In steering mechanism for self-propelled vehicles having wheels which are turned to effect the steering thereof, the combination with such wheels, of a manually operable power device, lever mechanism transmitting power from said device to said wheels to effect the steering movement, a throttle-operating lever provided with a slidable member thereon, speed gear means in operative relation to said member to cause said member to position on said lever according to changes of the speed gear, and connecting means between said member and said lever mechanism for changing the leverage of the latter mechanism to a greater extent for a given movement of the throttle-operating lever when said slidable member is in high gear position than in low gear position on said throttle lever.

In testimony whereof I have signed this specification in the presence of two subscribing witnesses.

DAVID H. COLES.

Witnesses:
C. A. L. MASSIE,
RALPH L. SCOTT.